UNITED STATES PATENT OFFICE.

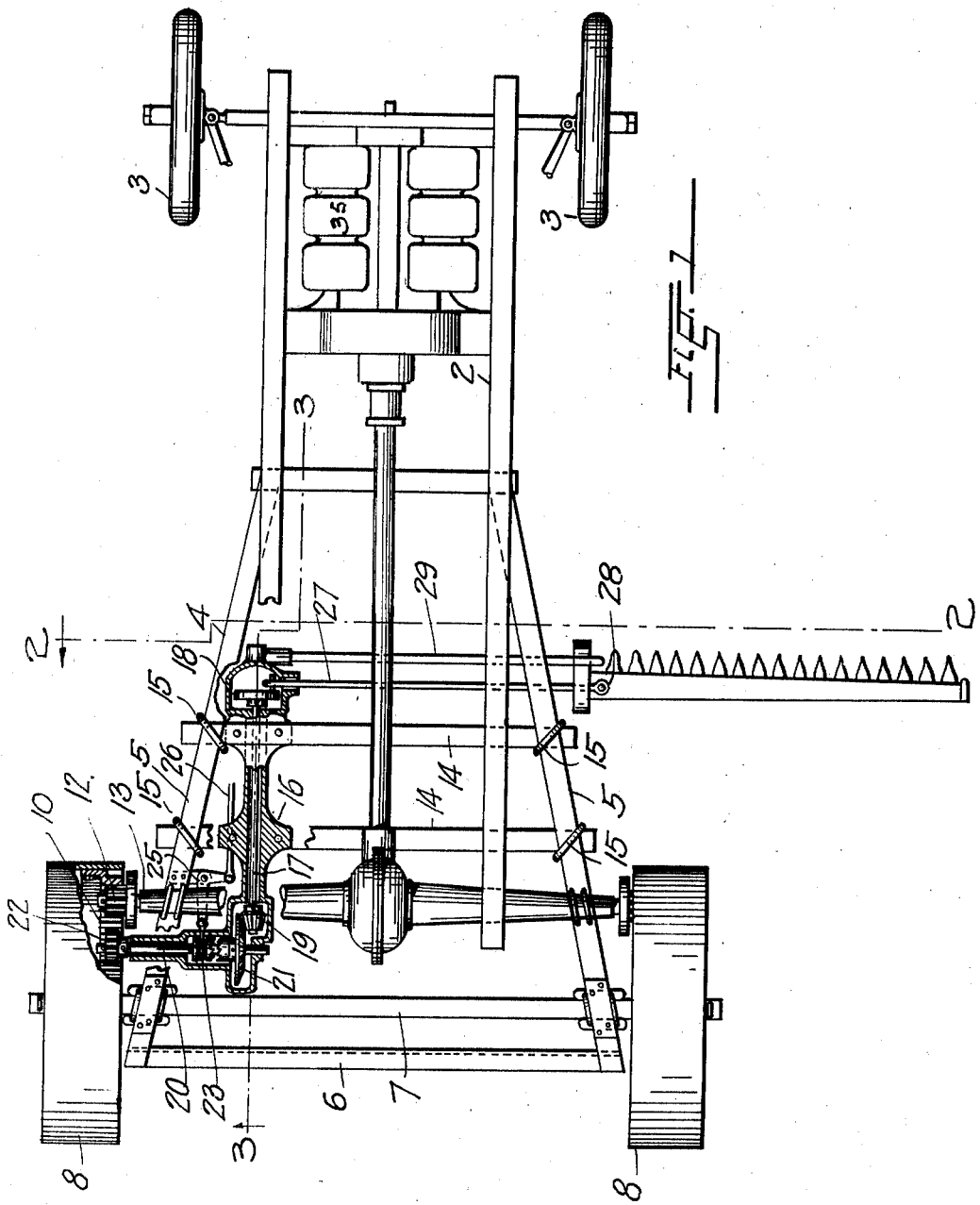

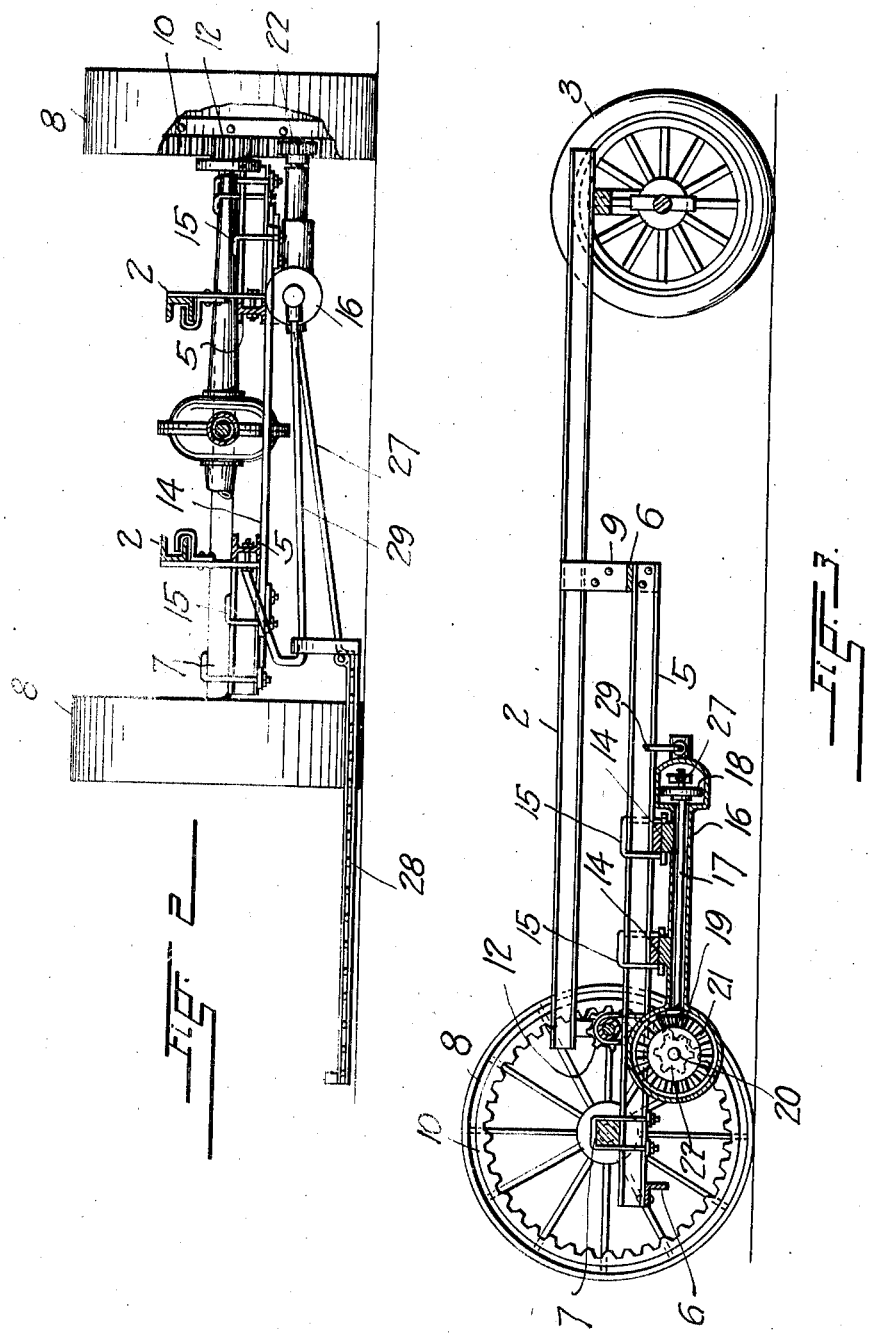

EDWARD W. SLIMM, OF BRIDGEPORT, NEBRASKA.

MOWING ATTACHMENT FOR TRACTORS.

1,303,606.   Specification of Letters Patent.   Patented May 13, 1919.

Application filed August 8, 1917. Serial No. 185,077.

*To all whom it may concern:*

Be it known that I, EDWARD W. SLIMM, a citizen of the United States, residing at Bridgeport, in the county of Morrill and State of Nebraska, have invented certain new and useful Improvements in Mowing Attachments for Tractors, of which the following is a specification.

This invention relates to a mowing mechanism for use on traction engines and tractor attachments for automobiles, and its primary object resides in the provision of a mechanism of simple construction which is assembled into a unitary device adapted for ready attachment to a traction-engine or tractor-attachment for automobiles and which includes a mowing appliance of ordinary construction, together with a mechanism for its operation by the movement of one of the traction-wheels of the self-propelling vehicle to which the attachment is applied.

With the above and other objects in view, all of which will fully appear in the course of the following description, my invention comprises the features of construction and combinations of parts shown in the accompanying drawings in the various views of which like parts are similarly designated, and in which—

Figure 1 is a sectional plan view of my improved power attachment in its operative position with relation to the frame and traction wheels of a tractor-attachment for automobiles, Fig. 2, a transverse section along the line 2—2, Fig. 1, and Fig. 3, a longitudinal section taken along the line 3—3, Fig. 1.

The reference character 2 designates the chassis of a motor-vehicle including the front wheels 3, and 4 the tractor-attachment which is secured thereto after the rear wheels of the vehicle have been removed.

The tractor-attachment consists in the form shown in the drawings, of a frame composed of a pair of divergent girders 5 and transverse connecting bars 6, usually made of structural metal.

The frame carries an axle 7 on which the traction-wheels 8 are mounted and it is secured to the chassis of the motor-vehicle by means of upright connections 9.

The traction-wheels 8 are provided with internal gears 10 for their operative connection with pinions 12 applied at the ends of the driving shaft 13 of the vehicle, which as usual is operatively connected with a motor 35.

The mowing attachment which is the subject of the present invention, comprises a frame preferably composed of a pair of parallel bars 14 which are equipped with U-shaped clips 15 or other suitable fastening devices for their rigid connection with the divergent girders 5 of the tractor-attachment.

Rigidly secured to the bars adjacent one of their ends, is a casing 16 designed to house a mechanism for transmitting the movement of one of the traction-wheels to the mowing appliance hereinafter to be described.

The transmission mechanism consists of a shaft 17 supported for rotation in bearings in the casing and carrying at its opposite ends a crank-wheel 18 and a beveled pinion 19.

A second shaft 20 rotatably mounted in the casing at right angles to the other shaft, is provided with a beveled gear-wheel 21 which meshes with the pinion 19, and at its outer end, with a pinion 22 for its operative connection with the internal gear of the adjacent traction wheel.

The continuity of the shaft 20 is broken by a clutch 23 the moving member of which is by means of a bell-crank 25 and a rod 26 connected with a lever or other operating device near the driver's seat of the vehicle, which may be of any conventional construction and for that reason has not been shown in the drawings.

A wrist-pin on the crank-disk 18 at the end of the shaft 17, connects with the end of a pitman 27 which loosely extends through an opening in the end of the casing for its attachment to the reciprocating knife-bar of a mowing appliance 28 the cutter-bar of which is rigidly secured to the casing 16 by means of a brace 29.

The mowing appliance projects laterally beyond a side of the motor-vehicle to which the tractor attachment is applied and it is hung close to the ground for cutting standing grain, forage and other plants along which the vehicle is driven.

It will be readily seen that by the operation of the power transmission mechanism assembled in the casing, the rotary movement imparted to the traction wheels by their connection with the motor of the vehicle, is translated into a reciprocating motion of the knife bar of the mowing appliance.

While my attachment is particularly adapted for the operation of a mower of the type shown in the drawings, it may be effectively used to impart an operative movement to other agricultural implements and it will be understood without further illustration that my invention is applicable to permanent tractors as well as to the tractor attachments by which a self-propelled vehicle of conventional construction is transformed into a traction engine.

I also desire it understood that while I have shown and described my attachment in the best form at present known to me, variations in the construction and arrangement of its parts may be resorted to for its adaptation for use on vehicles of different constructions and in connection with implements of a nature different from that of the mowing appliance herein described.

Having thus described my invention what I claim and desire to secure by Letters-Patent is:

1. The combination with a power-driven vehicle including traction wheels, a chassis having girders between the same, a gear-wheel in operative connection with one of the traction wheels and a motor in driving connection with the gear-wheel, of a frame detachably fastened to the girders of the chassis, a mower on the frame, and mechanism for the transmission of power to the mower, mounted in its entirety on the frame and including a driving pinion, the frame being positioned with relation to said gear-wheel to hold the pinion in operative engagement therewith.

2. The combination with a power-driven vehicle including traction-wheels, a chassis having girders between the same, a gear-wheel mounted on one of the traction-wheels, and a motor in driving connection with the gear-wheel, of a frame detachably fastened to the girders of the chassis, a mower on the frame, and mechanism for the transmission of power to the mower, mounted in its entirety on the frame and including a driving pinion, the frame being positioned with relation to the traction-wheel to hold the pinion in operative engagement with the gear-wheel thereof.

3. A mowing attachment for power-driven vehicles comprising a frame adapted to be detachably fastened to girders of the chassis of a motor-vehicle beneath the body of the same, a mower carried by the frame, and mechanism for the transmission of power to the mower, mounted in its entirety on the frame and including a driving-pinion for its operative connection with a gear-wheel of the vehicle when the frame is in place thereon.

In testimony whereof I have affixed my signature in presence of two witnesses.

EDWARD W. SLIMM.

Witnesses:
FRANK IRVING,
LLOYD WIGGINS.